United States Patent [19]

Lapidus

[11] 4,093,857
[45] June 6, 1978

[54] RADIOGRAPHIC NORMALIZING SYSTEM

[75] Inventor: Stanley N. Lapidus, Burlington, Mass.

[73] Assignee: Raytheon Company, Lexington, Mass.

[21] Appl. No.: 752,650

[22] Filed: Dec. 20, 1976

[51] Int. Cl.² .................... G01T 1/166; G01T 1/20
[52] U.S. Cl. ............................ 250/369; 250/363 S
[58] Field of Search .......................... 250/363 S, 369

[56] References Cited

U.S. PATENT DOCUMENTS

| | | | |
|---|---|---|---|
| 3,732,420 | 5/1973 | Brunnett et al. | 250/363 S X |
| 3,916,198 | 10/1975 | Coltman et al. | 250/363 S |
| 3,988,585 | 10/1976 | O'Neill et al. | 250/363 S |
| 4,020,348 | 4/1977 | Turcotte et al. | 250/363 S |

Primary Examiner—Archie R. Borchelt
Attorney, Agent, or Firm—David M. Warren; Joseph D. Pannone; Milton D. Bartlett

[57] ABSTRACT

A system for portraying data obtained by a radiographic camera, such as an Anger camera, which signals the occurrences of radioactive events and the addresses of locations of the events. Data is obtained from a reference subject and a living subject. The activity of events of the reference subject is stored as a function of event location and is utilized as scale factors for scaling the relative energies of event signals obtained from the living subject, whereby data of the living subject is normalized relative to the reference subject.

6 Claims, 1 Drawing Figure

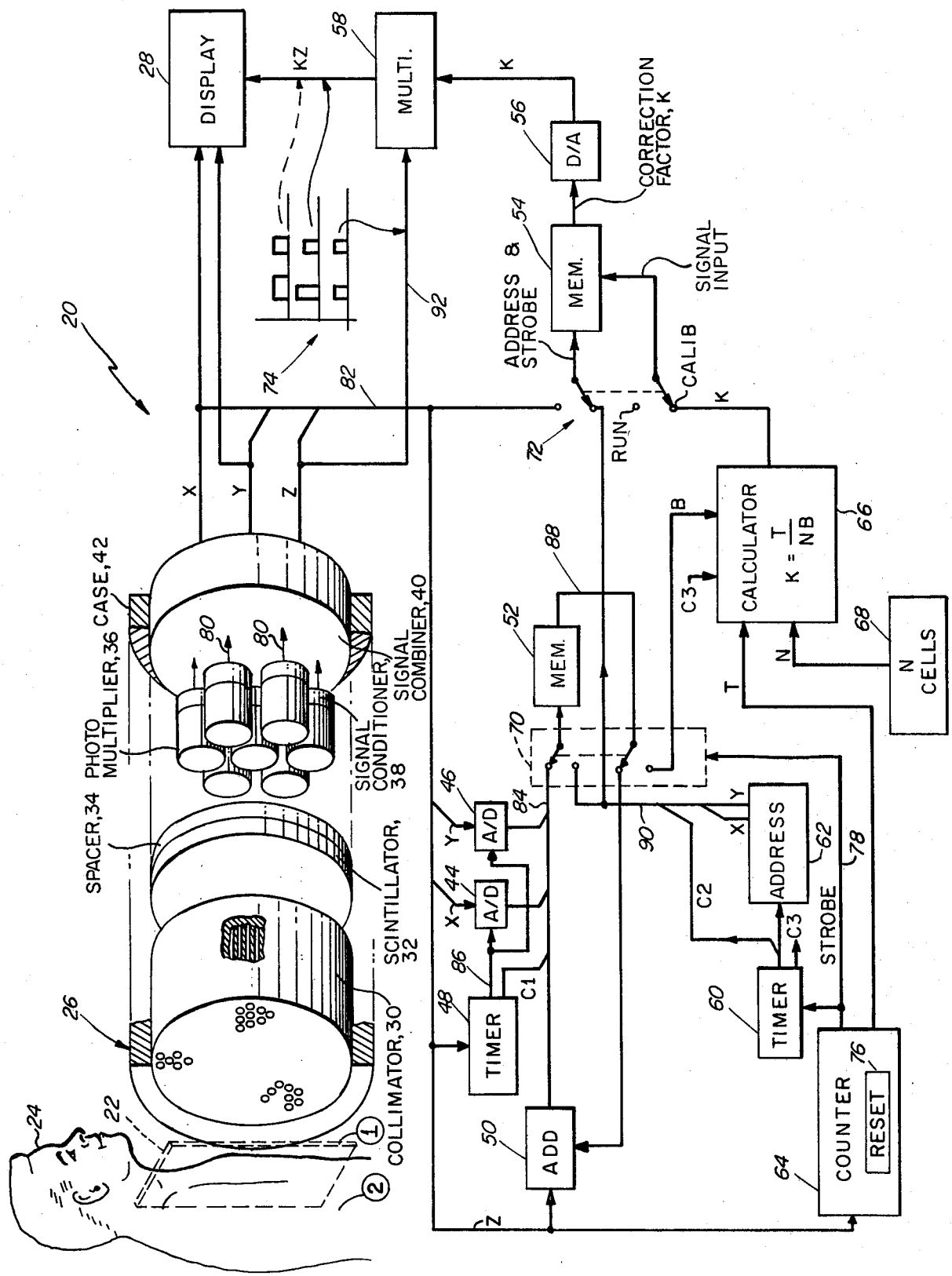

RADIOGRAPHIC NORMALIZING SYSTEM

BACKGROUND OF THE INVENTION

A radiographic camera such as the Anger camera disclosed in the U.S. Pat. No. 3,011,057 which issued in the name of H. O. Anger on Nov. 28, 1961 and in the U.S. Pat. No. 3,914,611 which issued in the name of K. J. Stout on Oct. 21, 1975, is often utilized for obtaining a radiographic image of a radioactive subject. Such a camera includes a scintillator viewed by a set of scintillation detectors or photomultiplier tubes providing signals which are combined, typically, by a resistor matrix to provide a Z-axis signal which signals the presence of a radioactive event in the subject. Resistor matrices also combine the detector signals to provide coordinate axes signals, Cartesian coordinates having X and Y signals being readily implemented, to serve as an address for locating the radioactive event.

A problem arises in that the many photomultiplier tubes utilized in present day cameras are subject to individual drifting which varies the locations and, hence, the density of the apparent locations of the radioactive events as provided by the coordinate axes signals. Regions of increased event density in the image of the subject appear to a clinician viewing the image as regions of greater intensity. As a result, a clinican viewing the image produced by the camera perceives regions of varying intensity which may be incorrectly diagnosed as a tumor or malady.

SUMMARY OF THE INVENTION

The foregoing problem is overcome and other advantages are provided by a radiographic system which, in accordance with the invention, compensates for variation in the locations of the camera signals signaling radioactive events so that a clinician views a correct image of the subject. Two subjects are utilized, the first, being in the form of a uniform sheet of radioactive material, will be referred to hereinafter as the reference subject while the second, a living organism such as a human being, will be referred to hereinafter as the clinical subject. The activity of radioactive events of the reference subject is stored as a function of event location and is utilized for providing scale factors for scaling the relative energies of Z-axis signals signaling events obtained from the clinical subject whereby data of the clinical subject is normalized relative to the reference subject. For convenience in explaining the invention, the aforementioned Z-axis signal of Anger camera will sometimes by referred to hereinafter as a Z signal or as an event signal, while the X and Y coordinate signals will be sometimes referred to hereinafter as the address signals. The scaling of the energies of the Z signals compensates for the variations in the density of image points on a display of the image so that the clinician perceives regions of the image with their correct intensities.

In a preferred embodiment of the invention, an adder and a memory are utilized for producing summations of event signals obtained from the reference subject, summations of the event signals obtained from a specific location of the reference subject being stored in the memory with the adder being utilized for adding further event signals to the stored summation. The locations in the memory are addressed by the address signals of the camera. The scale factors are obtained by counting a predetermined number of event signals to obtain an average value for the summations in each of the cells of the memory, this average then being divided by the value of the sum in each cell of the memory to obtain the scale factors corresponding to each location of the subject which is imaged by the camera. The obtaining of the scale factors completes the calibration portion of the operation of the radiographic system. Thereupon, the clinical subject is imaged with the X, Y and Z signals of the camera being utilized for presenting an image of the subject on a display, the X and Y signals serving to locate points on the display while the Z signal is scaled as described below and then utilized for modulating the intensity of the display in a manner analogous to that taught by the aforementioned patents of Anger and to Stout.

In accordance with the invention, the Z-axis signal is scaled prior to its being utilized for modulating the Z-axis of the display. The scaling is accomplished in real time, namely, at the same rates as the rate of occurences of the Z signals so that no delay in forming the image results from the scaling. The scaling may utilize a multiplying circuit which modulates the relative energy content of each pulse of the event signal, either by varying the amplitude of the signal or by varying the duration of each pulse whereby the product of signal amplitude times signal duration is altered. Alternatively, the scaling may involve a mathematical operation such as the raising of the Z signal to a power such as $Z^{0.9}$ or $Z^{1.1}$ in which the power is proportional to the scale factor. In the preferred embodiment disclosed hereinafter, the Z signal is multiplied directly by the scale factor. In particular, it is noted that in a display utilizing a cathode ray tube plus a photographic film plate for viewing the cathode ray tube, the intensity of an image point on the film plate depends on the product of the magnitude of a light pulse on the face of the cathode-ray tube by the duration of said pulse. The product of amplitude times width is proportional to the energy of an event pulse. By utilizing the aforementioned scale factors for modulating the relative energy content of the event pulses, the image of the clinical subject is normalized with respect to the reference subject with the result that the perceived intensities of the regions of the image become invariant with respect to drifting of the photomultiplier tubes.

BRIEF DESCRIPTION OF THE DRAWING

The aforementioned aspects and other features of the invention are explained in the following description taken in connection with the accompanying drawing which shows an exploded view of a radiographic camera and its coupling to the display by electrical circuitry of the invention, the electrical circuitry being shown in block diagrammatic form.

DESCRIPTION OF THE PREFERRED EMBODIMENT

Referring now to the figure, there is seen a system 20 for obtaining radiographic images of a reference subject 22 and a clinical subject 24 by means of a radiographic camera 26 and a display 28. The camera 26 includes a collimator 30, a scintillator 32, an optically transparent spacer plate 34, a set of scintillation detectors each of which incorporates a photomultiplier 36 and a signal conditioning circuit 38, and a signal combiner 40 which are supported by a case 42. Each signal conditioning circuit 38 includes integration and pulse shaping while the combiner 40 includes resistor matrices for forming the X, Y and Z axis signals in the manner such as that taught in the aforementioned Stout patent.

In accordance with the invention, the system 20 comprises analog-to-digital converters 44 and 46, a timer 48, an adder 50, memories 52 and 54, a digital-to-analog converter 56, a multiplier 58, a timer 60, an address generator 62, a counter 64, a calculator 66, a source 68, and switches 70 and 72. The adder 50 and the memory 52 are utilized for providing the sums of the event signals for Z axis signals identified by the letter Z in the figure, the sums being stored in the memory 52 in accordance with addresses provided by the X and Y signals from the camera 26. The counter 64 counts the total number of events, the total number being identified by the letter T in the figure. The average number of events per cell of the memory 52 is provided by the ratio T/N where N is the number of cells in the memory 52, the number N also being the number of resolution elements of the image produced by the camera 26 and presented on the display 28. The scale factor is identified by the letter K in the figure, a separate value of K being produced for each resolution element of the image by the calculator 66, the values of K being stored in the memory 54. Since the ratio T/N is constant, the value of K is seen by the formula shown in the figure for the calculator 66 to be inversely proportional to the value of B where B represents the magnitudes of the sums stored in the cells of the memory 52, there being one value of K for each value of B. The multiplier 58 multiplies the relative energies of the Z axis signals, shown in the bottom line of the graph 74 by the factor K to produce either a variation in magnitude of the Z axis signal, as shown in the second line of the graph 74, or a variation in the duration of the Z axis signal as is shown in the first line of the graph 74. The product of the multiplication, identified in the figure by the symbol KZ, is applied to the display 28.

The storing of the sums of the event signals in the memory 52 during the calibration of the system 20 is accomplished as follows. First, the reference subject 22 is placed in front of the camera 26. The reference subject 22 is typically in the form of a flat sheet uniformly impregnated with a radioactive material for uniformly illuminating the front face of the collimator 30. The switch 72 is manually set in the calibrate position as shown in the figure. The counter 64 is manually reset to zero by the reset button 76. In the reset condition of the counter 64, the counter 64 provides a logic state of zero on line 78 under which condition the switch 70 has the position as shown in the figure.

In response to the illumination provided by the reference subject 22, scintillations appear on the scintillator 32, the scintillations being converted by the photomultipliers 36 and the signal combiners 40 to pulse signals which are coupled via the lines 80 to the signal combiner 40 which combines the signals on the lines 80 to produce the X, Y and Z signals which are seen to fan into the line 82. The X and Y signals of line 82 are coupled to the converters 44 and 46 which convert the X and Y signals from an analog format to a digital format, the digital formated signals being seen to fan into line 84. The Z, or event, is coupled via the line 82 to the timer 48, the adder 50 and the counter 64. In response to each strobing of the timer 48 by the Z signal, the timer 48 provides clock signals on line 86 for operating the converters 44 and 46, the timer 48 also providing clock pulses, identified by the legend C1, which are seen to fan into the line 84 for operating the memory 52 to store digital numbers at locations corresponding to the address of the X and the Y signals.

In response to the clock signals C1, the contents of a cell of the memory 52 is incremented upon the occurences of successive events at the address of the cell. The contents of the cell is coupled along line 88 from the output terminal of the memory 52 via the switch 70 to an input terminal of the adder 50 to be summed with the Z signal. The resulting sum from the adder 50 is coupled via the line 84 and the switch 70 back to the same cell of the memory 52, this cell being addressed by the X and the Y signals of the converter 44 and 46. With each appearance of a Z signal in combination with a specific address of the X and the Y signals, the memory 52 makes available to the adder 50 the previously stored sum at that address, the adder 50 then incrementing that sum by a count of 1 corresponding to the one event signaled by the Z axis signal. In this way, each cell of the memory 52 stores a count of the number of radioactive events from the reference subject 22 which have appeared at the image location corresponding to the address of that cell of the memory 52.

When the counter 64 attains a count of T events, this being a predetermined number to which the counter 64 is preset, the counter 64 provides a logic level of 1 on line 78 which serves as a strobe signal for operating the switch 70 to its alternate position whereupon the line 84 is disconnected from the memory 52. Thereupon, no new data enters the memory 52. The signal on line 78 also strobes the timer 60 to operate the memory 52 in a read-only mode via clock pulses C2. In addition, the timer 60 strobes the address generator 62 which sequentially addresses each cell of the memory 52 by means of X and Y signals generated by the generator 62. Signals are coupled from the output terminal of the memory via line 88 and the switch 70 to the B input terminal of the calculator 66. The timer 60 also provides timing signals C3 for operating the calculator 66 to perform the calculation in accordance with the formula shown on the figure in the block identifying the calculator 66. Thus, for each sum B coupled from a cell of the memory 52 to the calculator 66, the calculator 66 provides electrical signals in a digital format representing a value of the scale factor K, these electrical signals being coupled via the switch 72 to the memory 54 and representing a measure of the activity of radioactive events at a specific location of the reference subject. The clock pulses C2 and the address signals of the generator 62, which are seen to fan into the line 90 and be coupled via the switch 70 to the memory 52, are also coupled via the switch 72 to the memory 54 for strobing and addressing the memory 54 in accordance with the strobing and addressing of the memory 52. Thereby, the memory 54 stores a set of scale factors K at locations corresponding to the resolution elements of the image corresponding to the X and Y coordinate locations of the resolution elements.

During the second phase of the operation of the system 20, the switch 72 is manually positioned in the run position and the reference subject 22 is replaced with the clinical subject 24. Thereupon, the camera 26 and the display 28 are operated to produce an image on the display 28 in the manner commonly employed in hospitals, as disclosed in the aforementioned Stout patent except that, in accordance with the invention, each Z axis signal which signals a radioactive event is modified by the multiplier 58 before being applied to the Z axis terminal of the display 28.

With respect to the multiplication by the multiplier 58, it is noted that since the scale factors are stored in a digital format in the memory 54, the digitally formated scale factors are first converted to scale factors in an analog format by the converter 56 and then applied to the multiplier 58. The multiplier 58 may be an analog multiplier wherein the amplitude of the voltage provided by the converter 56 modulates the amplitude of the Z axis signals to provide the aforementioned scaling of the amplitude portrayed in the second line of the graph 74. Or, alternatively, the multiplier 58 may incorporate a pulse-width modulator circuit wherein the amplitude of the voltage provided by the converter 56 is utilized for varying the duration of the Z axis signal on line 92 to provide the aforementioned pulse-width modulated signal on the first line of the graph 74. Thereby, the products of the amplitudes of individual ones of the Z axis signals times the duration of the corresponding Z axis signals, this being equivalent to the relative energies in the pulses of the Z axis signals, are modulated to compensate for variations in the addresses of Z axis signals as may result in drifting of the gain characteristic of individual ones of the photomultipliers 36. In addition, it is noted that if the reference subject 22 be provided with a design, as by masking a portion of the reference subject 22 with a cross or a circle, the outline of the masked portion appears superposed upon an image seen on the display 28. If desired, a digital multiplier (not shown) may be utilized in lieu of the multiplier 58 in which case the converter 56 would be deleted and a pulse-width modulator (not shown) would be coupled between the digital multiplier and the display 28.

With reference to the calculations performed by the calculator 66, it has been found that, in an experimental model of the system 20 wherein the value of the total count T was held constant (7 million counts being utilized) as well as the number of resolution elements N being held constant, the variations in the magnitude of the sums B were sufficiently few in number such that the calculator 66 could be replaced by a read-only memory in which the memory address was supplied by the magnitude of the quantity B and in which the output of the memory was the desired scale factor K. Thereby, for each value of B presented to the read-only memory, a corresponding value of K was read out of the memory.

It is understood that the above-described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:

1. A system for coupling a display to a radiographic camera producing address signals signaling the locations of radioactive events, said system comprising:
   means coupled to said camera and responsive to said address signals for measuring the activity of event signals of said camera wherein each of said event signals represents the occurrence of a radioactive event in a subject being imaged by said camera, said measuring means providing activity signals including addresses of respective ones of said events which signal measures of said activity; and
   means coupled between said camera and said measuring means for mathematically operating on the relative energies of respective ones of event signals by corresponding ones of said activity signals, each of said event signals having a common address with each of said corresponding ones of said activity signals, whereby data of said subject is normalized relative to said measurement of said activity.

2. A system according to claim 1 wherein said measuring means includes means responsive to address signals of said camera for storing sums of said event signals, individual ones of said sums being identified in said storing means by an address of said address signals.

3. A system according to claim 2 wherein said operating means comprises a multiplier for multiplying said relative energies by corresponding ones of said activity signals.

4. A system according to claim 2 wherein said measuring means further comprises an incrementing means coupled between said camera and said storing means for incrementing the sum of a previously stored sum of events.

5. A system according to claim 4 wherein said measuring means further comprises a counter for counting the occurrences of said event signals, said storing of sums of event signals being terminated in response to a signal of said counter when said counter counts a predetermined number of said event signals.

6. A system according to claim 2 wherein said measuring means further comprises means responsive to values of said stored sums of event signals for providing said activity signals, said storing means including means for storing said activity signals with each activity signal being identified by an address corresponding to the address of said address signals.

* * * * *